United States Patent Office 2,956,054
Patented Oct. 11, 1960

2,956,054
NITROGEN HETEROCYCLIC COMPOUNDS

Gerald D. Laubach, Jackson Heights, N.Y., assignor to Chas. Pfizer & Co., Inc., New York, N.Y., a corporation of Delaware No Drawing. Filed Aug. 11, 1958, Ser. No. 754,177

8 Claims. (Cl. 260—243)

This application is concerned with new and useful compounds and the process for their preparation as well as novel intermediates from which they are prepared. More particularly the present invention relates to new and useful compounds which are possessed of valuable therapeutic properties.

The new compounds of the present invention may be represented by the following formula:

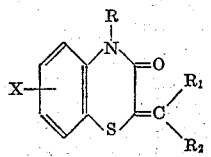

wherein X is selected from the group consisting of hydrogen, halogen, and alkoxy, alkyl and alkanoyl each containing up to 3 carbon atoms; R is selected from the group consisting of hydrogen and alkyl containing 1 to 3 carbon atoms; $R_1$ is alkyl containing 1 to 3 carbon atoms; and $R_2$ is selected from the group consisting of hydrogen and alkyl containing 1 to 3 carbon atoms.

Of course the above described represent preferred substituents. As is obvious, R, $R_1$ and $R_2$ may be of higher carbon content and the benzenoid ring further substituted by the same substituents as above described for X. The present compounds may be called 2-alkylidene-1,4-benzothiazane-3-ones.

It has been surprisingly found that the valuable new compounds of the present invention are prepared by treatment of 2-alkyl-1,4-benzothiazane-3-one of the formula:

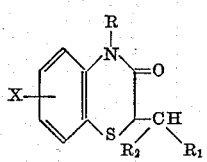

in which X is selected from the group consisting of hydrogen, halogen, and alkoxy, alkyl and alkanoyl containing up to 3 carbon atoms; R is selected from the group consisting of hydrogen and alkyl containing 1 to 3 carbon atoms; and $R_1$ is alkyl containing 1 to 3 carbon atoms; and $R_2$ is selected from the group consisting of hydrogen and alkyl containing 1 to 3 carbon atoms; with a chlorinating agent, for example, chlorine or sulfuryl chloride. The reaction may be carried out in any reaction-inert solvent but best results are obtained when employing liquid halogenated hydrocarbon solvents especially those of up to 6 carbon atoms. By reaction-inert solvent is meant a solvent which does not react with the starting compound or the chlorinating agent. Such solvents, of course, should dissolve the starting materials and may be determined by a minimum of routine laboratory testing. Suitable halogenated hydrocarbon solvents are: methylene chloride, ethylene chloride, butyl bromide, hexylchloride, dichlorobutane, heptylchloride, butylfluoride, propylene chloride, iodopentane, chlorobenzene, bromotoluene, chloroform, carbon tetrachloride and the like. The reactants should be employed in at least an equimolar ratio but, of course, it is to be understood that an equimolar ratio is used to obtain appreciable yield. It is known that less than an equimolar ratio of reactants leads to incomplete reaction and hence is not preferred, although operable. Best yields of product are obtained when employing excess chlorinating agent, for example, excesses of up to 50 mole percent. Larger excesses may be employed but no appreciable advantage is realized in so doing.

The yield of product may be further enhanced by the addition of a hydrogen chloride acceptor to the reaction mixture. By "hydrogen chloride acceptor," as employed herein, is meant a substance which will convert hydrogen chloride to an unreactive state so that it will not be available to react with the desired product. As is obvious, hydrogen chloride is a by-product of the present process. Many hydrogen chloride acceptors may be employed in this process, for example, metal salts of organic acids such as lower alkanoic acids, for example, acetic, proprionic, and the like; organic amines, such as pyridine, toluidine, aniline, N-alkyl-substituted anilines, alkyl amines, such as ethyl, propyl, butyl, dimethyl, etc.; and metal oxides and hydroxides as well as metal salts of weak inorganic acids, for example, carbonic acid. Particularly effective are the alkali and alkaline earth metal salts of carbonic acid, namely, carbonate and bicarbonate salts. By alkali metal as employed herein is meant sodium, potassium and lithium; alkaline earth metal, barium, calcium, strontium and magnesium. The above carbonate salts are preferred since, on reaction with the by-product, hydrogen chloride, they form carbon dioxide, water and the appropriate metal chloride, which is insoluble in the reaction mixture and may be readily removed. Further, these salts are very economical and readily available. The salts may be employed in an amount theoretically required to react with the hydrogen chloride liberated in the present process. In reality, the amount of hydrogen chloride acceptor employed is not critical. Usually, a large molar excess is employed, especially if it is insoluble in the reaction mixture. The large molar excess, as much as 10 times the theoretical amount, provides for a more efficient reaction with the hydrogen chloride. To this end, vigorous stirring of the reaction mixture is also found helpful. It is not intended, however, that a hydrogen chloride acceptor is required in the process of the present invention, since appreciable yield of product is obtained in its absence.

The reaction of chlorinating agent with the 2-alkyl-1,4-benzothiazane-3-one is almost instantaneous as evidenced by the formation of product with the addition of the reagent. To ensure completeness of reaction, the reaction mixture is generally stirred for from about 1 to about 4 hours after addition of chlorinating agent, although this is not essential. The temperature of the reaction should be maintained at from about —10° to about 10° C. for best results. Higher or lower temperatures may be employed but may lead to reduced yield of product. The chlorinating agent, viz. chlorine or sulfuryl chloride, is preferably added to the reaction mixture at a rate which allows ready control of the reaction. The method of addition is not critical, however, since the product is obtained on mere contact of reactants. The product is recovered by conventional procedures. For example, the product is filtered from the reaction mixture and then recrystallized from suitable solvents.

The 2-alkyl-1,4-benzothiazane-3-ones described above are new compounds which are prepared by condensation of an o-aminobenzenethiol of the formula:

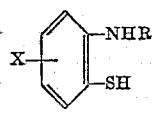

in which X and R are described above with an α-substituted ester of the formula:

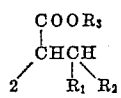

in which $R_1$ and $R_2$ are as described above, $R_3$ is lower alkyl, preferably ethyl or methyl and Z is halogen (Cl, Br, I) or a hydrocarbon sulfonyl group such as arylsulfonyl, for example benzenesulfonyl and toluenesulfonyl (tosyl), and alkylsulfonyl, for example, methylsulfonyl (mesyl), ethylsulfonyl, etc. The reaction is best effected in a lower alkanol solvent, viz. methanol, ethanol, propanol, in the presence of a base such as an alkali metal hydroxide, viz. sodium, potassium or lithium hydroxide. Generally, the α-substituted ester is added to a solution of the aminobenzenethiol in alcoholic solution of hydroxide at a temperature of from about −10° to about 10° C. A precipitate forms almost immediately. After complete addition of ester, the mixture is refluxed for about 3 hours to ensure completeness of reaction, after which the product is recovered by conventional procedures. For example, the product is recovered by concentration of the filtered reaction mixture. The residue is then crystallized by trituration in petroleum ether. The present new therapeutic agents are generally effective as muscle relaxants. They are useful as tranquilizers and in the treatment of the symptoms of muscular disorders such as bursitis, rheumatism, spasticity, strains and the like. When administered by the intraperitoneal route to mice, the $L.D._{50}$ is 400–800 mg. 1 kg. of body weight. The therapeutic effectiveness of the present agents is found to be of appreciable duration which makes them valuable in the treatment of muscle disorders.

The compounds of the present invention are conveniently administered in composition form. Such compositions include a pharmaceutical carrier selected on the basis of the chosen route of administration and standard pharmaceutical practice. For example, they may be administered orally in the form of tablets containing such excipients as starch, milk, sugar, certain types of clay, etc. They may be administered in capsules, in admixtures with the same or equivalent excipients. They may also be administered orally in the form of oral suspensions which may contain flavoring and coloring agents. They may be injected parenterally, i.e. for example, intramuscularly or subcutaneously. For oral administration of the therapeutic agents of this invention, tablets or capsules containing from about 25 to about 200 mg. are suitable for most applications.

The physician will determine the dosage which will be most suitable for an individual patient and it will vary with the form of administration, the age, weight, and response of the particular patient. Generally, however, the initial dosage in adults may range from 300 to 600 mg. per day divided into 3 or 4 equal doses. In many instances, it is not necessary to exceed 400 mg. daily. After the initial dosage, the maintenance dosage may often be achieved with as little as 100 to 200 mg. daily.

The following examples are given by way of illustration and not to be construed as limitations of this invention, many variations of which are possible without departing from the spirit or scope thereof.

EXAMPLE I

*Preparation of 2-alkyl-1,4-benzothiazane-3-ones*

A solution of 18 g. of potassium hydroxide (0.32 mole) in absolute ethanol is added dropwise with stirring to a 3 necked flask containing 40 g. of o-aminobenzenethiol (0.32 mole) under nitrogen. Ethyl α-bromovalerate (0.32 mole) is added dropwise to the clear solution at 0° C. A precipitate is formed almost immediately and the resultant mixture is refluxed for 3 hours. The insoluble salt is filtered off and the filtrate concentrated in vacuo to yield a thick syrup which on trituration with a mixture of equal parts of ether and petroleum ether crystallizes as fine needles. Forty grams of 2-n-propyl-1,4-benzothiazane-3-one (61% yield), M.P. 77–79° C. is obtained. Elemental analysis gives the following results:

Calcd. for $C_{11}H_{13}NOS$: C, 63.74; H, 6.32. Found: C, 63.51; H, 6.13.

This procedure is used to prepare the following 2-alkyl-1,4-benzothiazane-4-ones from corresponding aminobenzenethiols and α-haloacidesters:

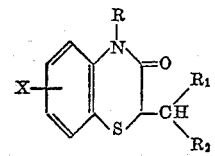

| R | $R_1$ | $R_2$ | X | Ester |
|---|---|---|---|---|
| H | H | $C_3H_7$ | H | $C_3H_7CH_2CH(Cl)COOC_2H_5$ |
| H | $CH_3$ | $CH_3$ | H | $(CH_3)_2CHCH(Br)COOC_2H_5$ |
| H | H | $CH_3$ | Cl | $CH_3CH_2CH(Br)COOC_2H_5$ |
| $CH_3$ | $C_3H_7$ | $CH_3$ | Cl | $C_3H_7CH(CH_3)CH(Br)COOCH_3$ |
| $C_3H_7$ | $C_2H_5$ | $C_2H_5$ | Br | $C_2H_5CH(C_2H_5)CH(Br)COOC_2H_5$ |
| $CH_3$ | $CH_3$ | $CH_3$ | $CH_3CO$ | $(CH_3)CHCH(mesyl)COOCH_3$ |
| H | H | $CH_3$ | $C_2H_5CO$ | $CH_3CH_2CH(Br)COOC_2H_5$ |
| $CH_3$ | H | $C_2H_5$ | $OCH_3$ | $C_2H_5CH_2CH(tosyl)COOC_2H_5$ |
| $C_2H_5$ | $CH_3$ | H | $OC_3H_7$ | $CH_3CH_2CH(Br)COOC_2H_5$ |
| H | $CH_3$ | $CH_3$ | F | $(CH_3)_2CHCH(I)COOC_2H_5$ |
| $CH_3$ | $C_3H_7$ | $C_3H_7$ | I | $C_3H_7CH(C_3H_7)CH(Br)COOC_2H_5$ |
| $C_2H_5$ | H | $CH_3$ | $C_3H_7$ | $CH_3CH_2CH(tosyl)COOC_2H_5$ |

EXAMPLE II

A mixture of 9 g. (0.043 mole) of 2-isopropyl-1,4-benzothiazane-3-one and 30 g. of $CaCO_3$ in 100 ml. of methylene chloride is stirred at 0° C. while 6.75 g. (0.05 mole) of sulfuryl chloride is added. A precipitate forms immediately. The slurry is stirred for 3 hours at room temperature, filtered and recrystallized from ethyl acetate to give 7.3 g. of 2-isopropylidene-1,4-benzothiazane-3-one, M.P. 213–215° C. Elemental analysis gives the following results:

Calcd. for $C_{11}H_{11}NOS$: C, 63.36; H, 5.40. Found: C, 64.16; H, 5.47. The ultraviolet absorption maxima have $E_{1cm}^{1\%}$ 17,150 (233 mμ), 9260 (262 mμ), 3530 (310 mμ) in ethanol

EXAMPLE III

The procedure of Example I is repeated at 10° C. employing 2-n-propyl-1,4-benzothiazane-3-one in place of the isopropyl compound to obtain 2-n-propylidene-1,4-benzothiazane-3-one, M.P. 131–133° C. Ultraviolet absorption maxima have $E_{1\ cm.}^{1\%}$ 18,720 (232 m$\mu$), 10,940 (265 m$\mu$), 4,940 (320 m$\mu$)

Elemental analysis gives the following results:

Calcd. for $C_{11}H_{11}NOS$: C, 64.36; H, 5.40. Found: C, 64.10; H, 5.45.

EXAMPLE IV

*Preparation of 2-n-butylidene-1,4-benzothiazane-3-one*

To a slurry of 25 g. (0.113 mole) of 2-n-butyl-1,4-benzothiazane-3-one and 113 g. (1.13 moles) of calcium carbonate in 1.3 liters of methylene chloride is added dropwise at 0° C. with mechanical stirring 13.6 ml. (0.17 moles) of sulfuryl chloride. The resultant yellow reaction mixture is stirred at room temperature for 3 hours. The calcium carbonate cake is filtered, repulped in methylene chloride and the total methylene chloride and the total methylene chloride filtrates combined and successively washed with water, aqueous sodium bisulfite, water, aqueous sodium bicarbonate and water. Concentration of the methylene chloride extract at reduced pressure gives a solid product which, after recrystallization from methanol, yields 22 g. (80% of fine needles, M.P. 141–143° C.). The ultraviolet absorption maxima have $E_{1\ cm.}^{1\%}$ 18,100 (230 m$\mu$), 10,410 (265 m$\mu$) and 3,123 (322 m$\mu$)

Elemental analysis of this compound gives the following results:

Calcd. for $C_{12}H_{13}NOS$: C, 65.72; H, 5.97. Found: C, 65.56; H, 6.05.

EXAMPLE V

The remaining 1-alkyl-1,4-benzothiazane-3-ones of Example I are respectively converted to the following 1-alkylidene-1,4-benzothiazane-3-ones by the procedure of Example IV:

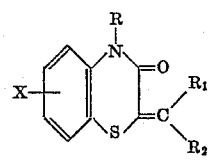

| R | R$_1$ | R$_2$ | X |
|---|---|---|---|
| H | H | CH$_3$ | Cl |
| CH$_3$ | C$_3$H$_7$ | CH$_3$ | Cl |
| C$_3$H$_7$ | C$_2$H$_5$ | C$_2$H$_5$ | Br |
| CH$_3$ | CH$_3$ | CH$_3$ | CH$_3$CO |
| H | H | CH$_3$ | C$_2$H$_5$CO |
| CH$_3$ | H | C$_2$H$_5$ | OCH$_3$ |
| C$_2$H$_5$ | CH$_3$ | H | OC$_3$H$_7$ |
| H | CH$_3$ | CH$_3$ | F |
| CH$_3$ | C$_3$H$_7$ | C$_3$H$_7$ | I |

EXAMPLE VI

The procedure of Example II is repeated employing chlorine gas in place of sulfuryl chloride at −10° C. The gas is bubbled through the reaction mixture by a gas delivery tube to produce 2-isopropylidene-1,4-benzothiazane-3-one from the corresponding 2-isopropyl compound in comparable yield.

EXAMPLE VII

The procedure of Example II is repeated employing the following liquid halogenated hydrocarbons: butylbromide, ethylene chloride, hexylchloride, dichlorobutane, heptylchloride, butylfluoride, propylene chloride, iodopentane, chlorobenzene and bromotoluene with comparable results.

EXAMPLE VIII

The procedure of Example II is repeated employing in place of $CaCO_3$, $NaHCO_3$, $K_2CO_3$, $BaCO_3$, $Li_2CO_3$, $MgCO_3$, $Ca(HCO_3)_2$ respectively with comparable results.

The starting compounds for the above reactions viz. aminobenzenethiols and $\alpha$-substituted acid esters are known compounds which are readily available or easily preparable by one skilled in the art.

EXAMPLE IX

A tablet base is prepared by blending the following ingredients in the proportion by weight indicated:

| | |
|---|---|
| Sucrose, U.S.P. | 82.0 |
| Tapioca starch | 13.6 |
| Magnesium stearate | 4.4 |

Into this base is blended a sufficient amount of 2-isopropylidene-1,4-benzothiazane-3-one to provide tablets each containing 25 mg. of active ingredient.

EXAMPLE X

Into the tablet base of Example VIII is blended a sufficient amount of 2-n-butylidene-1,4-benzothiazane-3-one to provide tablets containing 50 mg., 100 mg., and 200 mg. of active ingredient.

EXAMPLE XI

Sesame oil is sterilized by heating at 120° C. for 2 hours. To this oil a sufficient quantity of pulverized 2-isopropylidene-1,4-benzothiazane-3-one to make a 0.025% suspension by weight. The solid is thoroughly dispersed in the oil by use of a colloid mill. It is then filtered through a 100 to 250 mesh screen and poured into sterile vials.

EXAMPLE XII

Aqueous suspensions are prepared each containing 50 mg. per teaspoonful (5 ml.) of each of the above-described 2-alkylidene-1,4-benzothiazane-3-ones in a vehicle composed of U.S.P. simple syrup containing the following materials per 100 ml. of vehicle:

| | |
|---|---|
| F.D. and C. yellow No. 5 mg | 5 |
| Carboxymethylcellulose, low-viscosity type mg | 1 |
| Synthetic lemon flavor (Freitsche) ml | 0.1 |

These suspensions are particularly well adapted for oral administration of the active agent.

EXAMPLE XIII

To a commercially available raspberry-flavored sugar syrup is added the equivalent of 40 mg. of 1-n-butylidene-1,4-benzothiadiazane-3-one per milliliter and the mixture is homogenized in a mechanical device for this purpose. This mixture is especially suitable for oral administration, containing 200 mg. of the active ingredient per teaspoonful (5 ml.).

What is claimed is:

1. A compound represented by the formula:

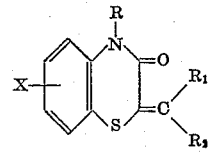

wherein X is selected from the group consisting of hydrogen, halogen, and alkoxy, alkyl and alkanoyl each containing 1 to 3 carbon atoms; R is selected from the group consisting of hydrogen and alkyl containing 1 to 3 carbon atoms; R$_1$ is alkyl containing 1 to 3 carbon atoms; and R$_2$ is selected from the group consisting of hydrogen and alkyl containing 1 to 3 carbon atoms:

2. 2-isopropylidene-1,4-benzothiazane-3-one.
3. 2-n-propylidene-1,4-benzothiazane-3-one.
4. 2-n-butylidene-1,4-benzothiazane-3-one.

5. A process for the production of a 2-alkylidene-1,4-benzothiazane-3-one which process comprises reacting a compound represented by the formula:

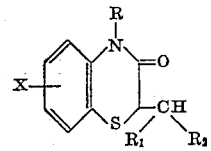

in which X is selected from the group consisting of hydrogen, halogen, and alkoxy, alkyl and alkanoyl containing 1 to 3 carbon atoms; R is selected from the group consisting of hydrogen and alkyl containing 1 to 3 carbon atoms; $R_1$ is alkyl containing 1 to 3 carbon atoms; and $R_2$ is selected from the group consisting of hydrogen and alkyl containing 1 to 3 carbon atoms; with a chlorinating agent selected from the group consisting of chlorine and sulfuryl chloride in a liquid, halogenated hydrocarbon solvent of up to 6 carbon atoms at a temperature of from about $-10°$ C. to about $10°$ C.

6. A process as claimed in claim 5 in which the reaction is carried out in the presence of a hydrogen chloride acceptor.

7. A process as claimed in claim 6 in which the hydrogen chloride acceptor is selected from the group consisting of alkali and alkaline earth metal carbonates and bicarbonates.

8. A process as claimed in claim 5 in which up to a 50 mole-percent excess of chlorinating agent is employed.

References Cited in the file of this patent

FOREIGN PATENTS

| | | |
|---|---|---|
| 447,179 | France | Oct. 21, 1912 |
| 256,342 | Germany | Feb. 10, 1913 |
| 855,257 | Germany | Nov. 10, 1952 |

OTHER REFERENCES

Knorr: Ber. der Deutsch. Chem. Gesell., vol. 30, pp. 2393–2396 (1897).

Mills et al.: J. Chem. Soc., 1927, pp. 2738–2753.

Mackie: J. Chem. Soc., 1949, pp. 1315–1316.

Mackie et al.: J. Chem. Soc., 1952, pp. 787–790.

Bohme et al.: Chem. Abst., vol. 49, p. 15907 (1955), citing Arch. Pharm., vol. 286, pp. 437–441 (1953).

Wagner-Zook, Synthetic Org. Chem., pp. 35–38 (J. Wiley and Sons, N.Y., 1953).